United States Patent
Manico et al.

(10) Patent No.: US 8,698,941 B2
(45) Date of Patent: Apr. 15, 2014

(54) IMAGING APPARATUS WITH SWITCHABLE BEAM DEFLECTOR ARRAY

(75) Inventors: Joseph Anthony Manico, Rochester, NY (US); John Norvold Border, Walworth, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 170 days.

(21) Appl. No.: 13/103,138

(22) Filed: May 9, 2011

(65) Prior Publication Data

US 2012/0287322 A1 Nov. 15, 2012

(51) Int. Cl.
- H04N 7/14 (2006.01)
- H04N 5/222 (2006.01)
- H04N 5/225 (2006.01)
- G09G 5/00 (2006.01)

(52) U.S. Cl.
USPC ............... 348/344; 348/14.16; 348/333.01; 348/333.09; 345/632

(58) Field of Classification Search
USPC ............ 348/14.16, 333.01, 333.08, 333.09, 348/335, 340, 344, 374, 376; 345/632, 633
See application file for complete search history.

(56) References Cited

U.S. PATENT DOCUMENTS

| | | | |
|---|---|---|---|
| 3,499,702 A | 3/1970 | Goldmacher et al. | |
| 4,278,327 A | 7/1981 | McMahon et al. | |
| 4,385,799 A | 5/1983 | Soref | |
| 4,688,900 A | 8/1987 | Doane et al. | |
| 5,018,835 A | 5/1991 | Dorschner | |
| 5,159,445 A * | 10/1992 | Gitlin et al. | 348/14.01 |
| 5,406,323 A * | 4/1995 | Tanigaki et al. | 348/14.1 |
| 5,856,842 A * | 1/1999 | Tedesco | 348/14.16 |
| 6,323,892 B1 * | 11/2001 | Mihara | 348/14.01 |
| 6,454,414 B1 * | 9/2002 | Ting | 353/28 |
| 6,687,030 B2 | 2/2004 | Popovich et al. | |
| 6,885,414 B1 | 4/2005 | Li | |
| 6,999,649 B1 | 2/2006 | Chen et al. | |
| 7,003,139 B2 | 2/2006 | Endrikhovski et al. | |
| 7,034,866 B1 * | 4/2006 | Colmenarez et al. | 348/211.12 |
| 7,046,924 B2 | 5/2006 | Miller et al. | |
| 7,196,728 B2 * | 3/2007 | Campbell et al. | 348/340 |
| 7,206,022 B2 | 4/2007 | Miller et al. | |

(Continued)

FOREIGN PATENT DOCUMENTS

JP 2002335432 A * 11/2002

OTHER PUBLICATIONS

Semenova et al., "Liquid Crystal Based Optical Switches," Journal of Molecular Crystals and Liquid Crystals, vol. 413, pp. 385-398 (2004).

*Primary Examiner* — John Villecco

(57) ABSTRACT

A switchable imaging apparatus having an image display mode and an image capture mode, comprising: a display screen to provide a displayed image when the display screen is in a first display state, wherein the display screen is at least partially transparent when the display screen is switched to a second transparent state; a set of optical beam deflectors, each optical beam deflector being individually switchable between a first non-deflecting state and a second deflecting state wherein imaging light from a corresponding section of the scene is deflected into a camera positioned in a location peripheral to the display screen; and a controller which synchronously switches the display screen between the first display state and the second transparent state, and the individual optical beam deflectors between their first non-deflecting state and their second deflecting state, thereby providing the image display mode and the image capture mode.

25 Claims, 13 Drawing Sheets

(56) References Cited

U.S. PATENT DOCUMENTS

| | | |
|---|---|---|
| 7,233,684 B2 | 6/2007 | Fedorovskaya et al. |
| 7,256,764 B2* | 8/2007 | Izumi .......................... 345/104 |
| 7,609,310 B2* | 10/2009 | Miyagawa .................. 348/302 |
| 7,714,923 B2 | 5/2010 | Cok et al. |
| 7,808,540 B2* | 10/2010 | Cok ......................... 348/333.01 |
| 7,916,167 B2* | 3/2011 | Miyagawa et al. ........ 348/14.16 |
| 8,120,640 B2* | 2/2012 | Mikami ..................... 348/14.16 |
| 8,154,582 B2* | 4/2012 | Border et al. ............. 348/14.08 |
| 8,223,188 B2* | 7/2012 | Ryf et al. ................... 348/14.01 |
| 8,446,514 B2* | 5/2013 | Border et al. ................. 348/344 |
| 2002/0030775 A1* | 3/2002 | De Schipper ................. 349/113 |
| 2003/0071932 A1* | 4/2003 | Tanigaki ........................ 349/61 |
| 2003/0193599 A1* | 10/2003 | Campbell et al. ........ 348/333.01 |
| 2004/0189794 A1* | 9/2004 | Rambo et al. ............. 348/14.16 |
| 2005/0024489 A1* | 2/2005 | Fredlund et al. .............. 348/61 |
| 2007/0002130 A1* | 1/2007 | Hartkop ................... 348/14.16 |
| 2008/0106628 A1* | 5/2008 | Cok et al. ................. 348/333.01 |
| 2009/0009628 A1* | 1/2009 | Janicek ................... 348/231.99 |
| 2009/0278913 A1* | 11/2009 | Rosenfeld et al. ......... 348/14.16 |
| 2010/0194880 A1* | 8/2010 | Furutani et al. .............. 348/135 |
| 2011/0063490 A1* | 3/2011 | Ogita ...................... 348/333.01 |
| 2011/0279689 A1* | 11/2011 | Maglaque ................. 348/207.1 |
| 2011/0285861 A1* | 11/2011 | Maglaque ................. 348/207.1 |
| 2011/0285891 A1* | 11/2011 | Maglaque .................... 348/308 |
| 2012/0249724 A1* | 10/2012 | Morrison ................. 348/14.16 |
| 2012/0257004 A1* | 10/2012 | Smith et al. .............. 348/14.16 |
| 2013/0100332 A1* | 4/2013 | Kim et al. .................... 348/335 |

* cited by examiner

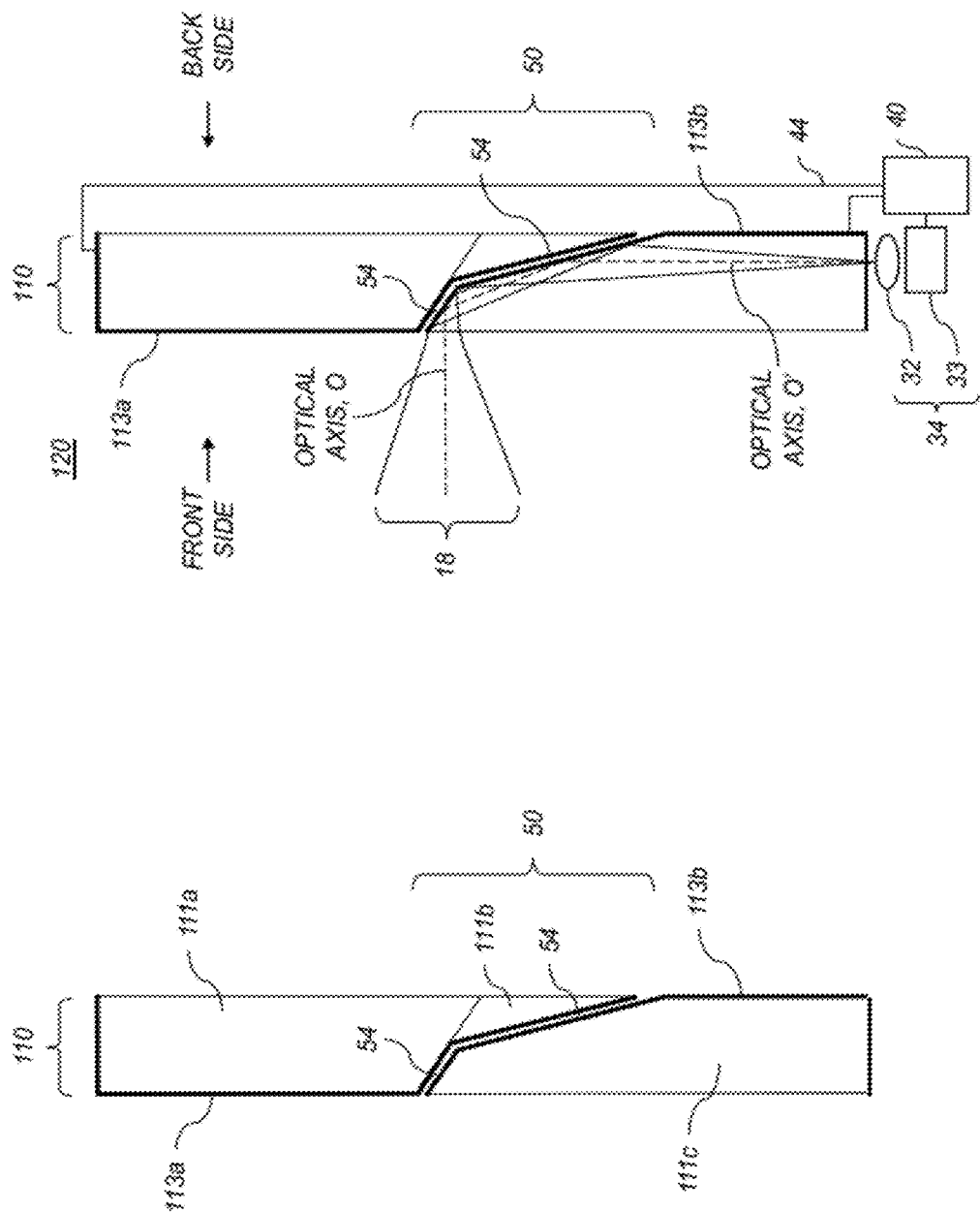

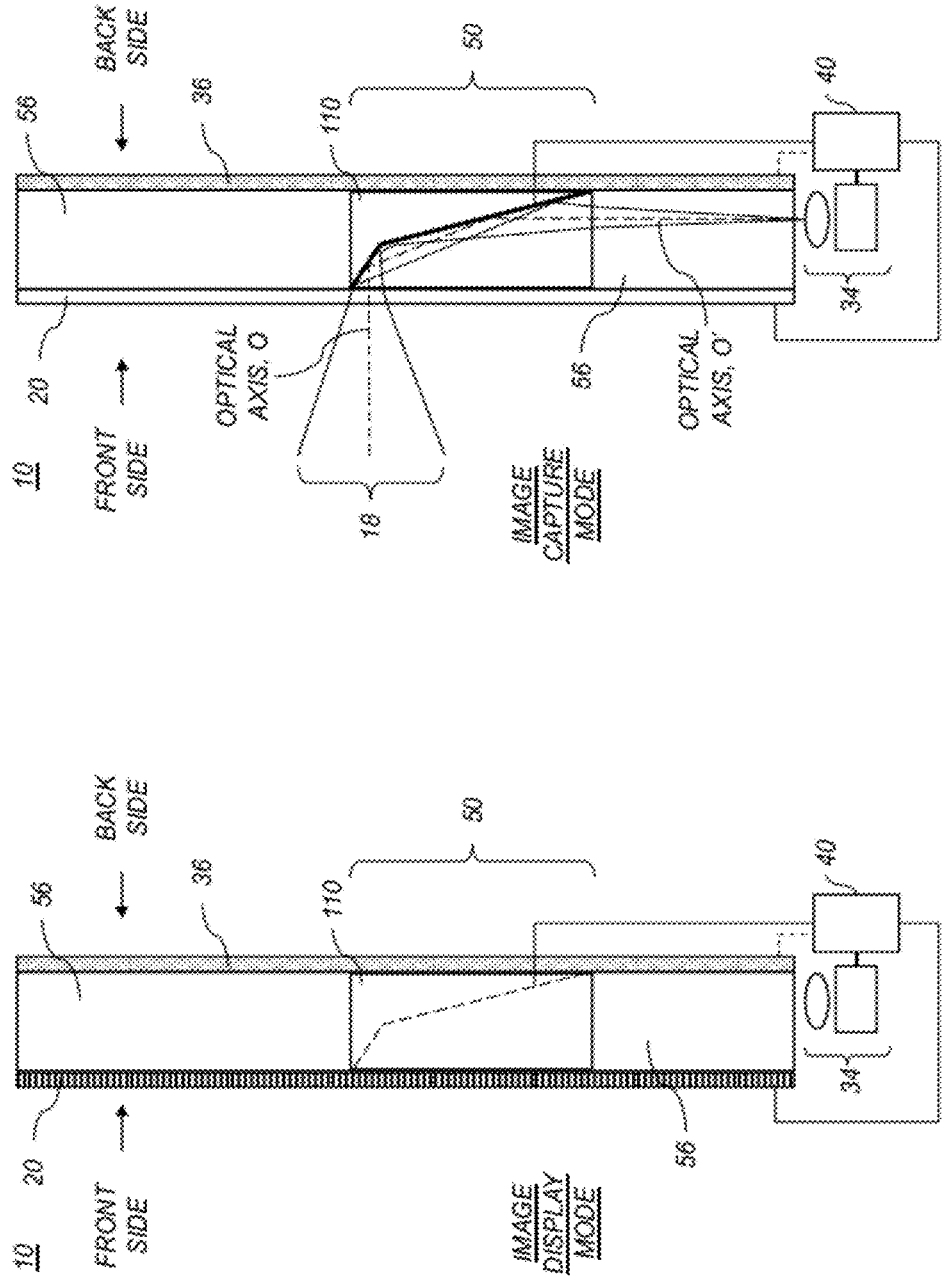

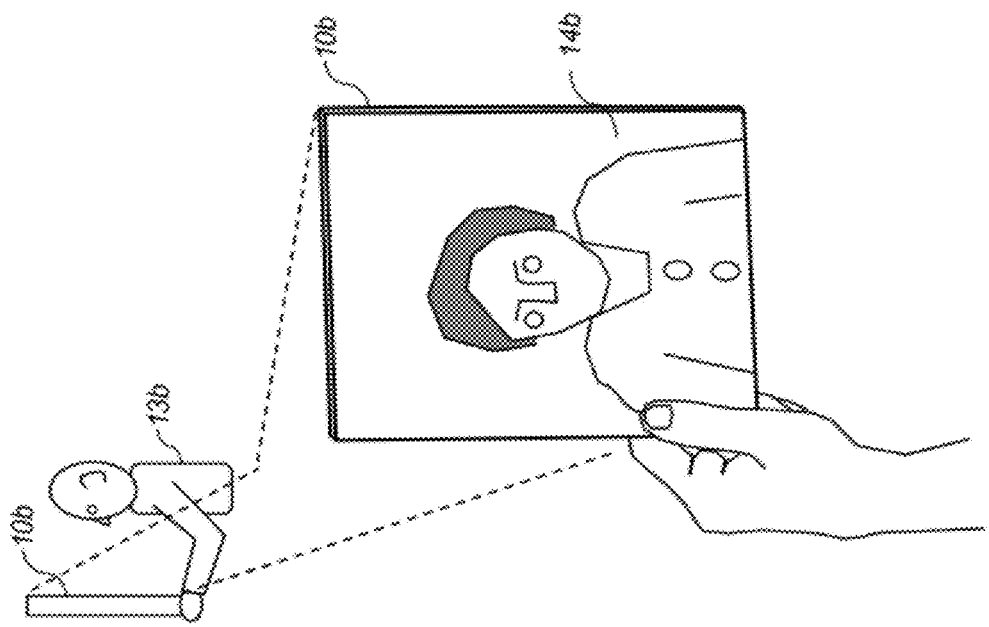
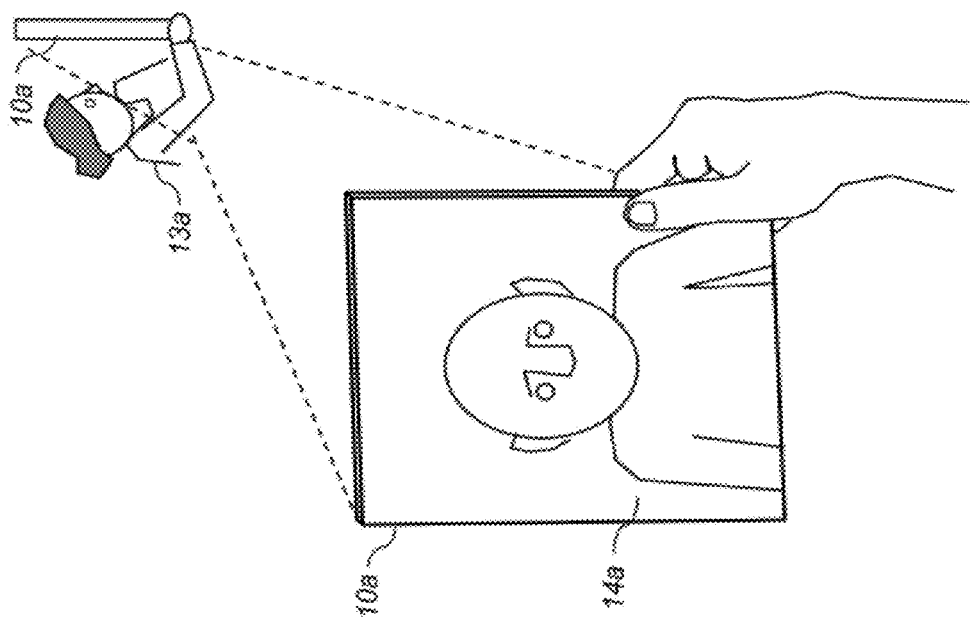
FIG. 6D

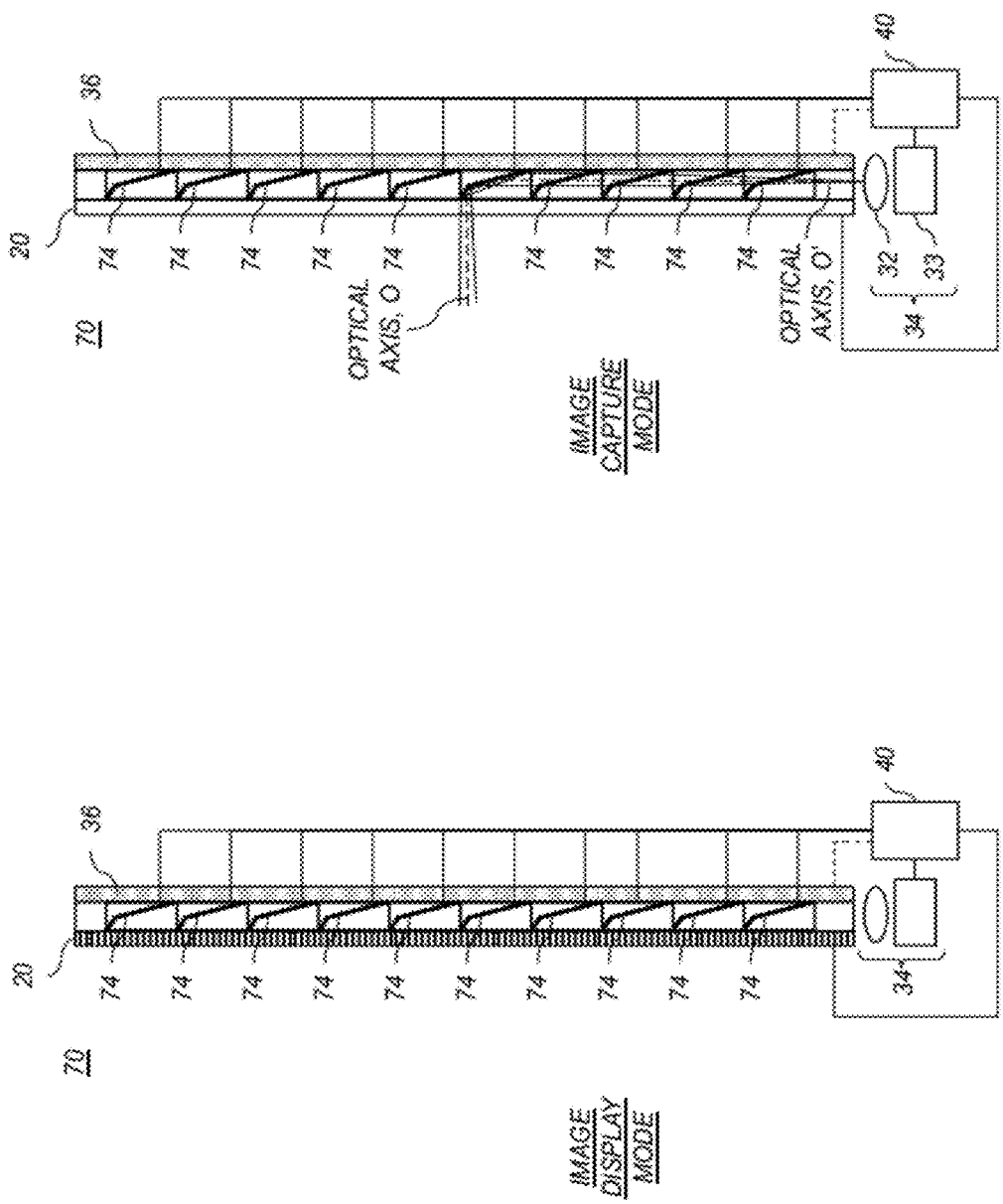

IMAGING APPARATUS WITH SWITCHABLE BEAM DEFLECTOR ARRAY

CROSS-REFERENCE TO RELATED APPLICATIONS

Reference is made to commonly assigned, co-pending U.S. Patent Application Publication No. 2012/0287321, entitled: "Switchable imaging apparatus for display and capture", by Border et al.; to commonly assigned, co-pending U.S. Patent Application Publication No. 2012/0287326, entitled: "Switchable imaging apparatus for viewing and capture", by Border et al.; to commonly assigned, co-pending U.S. Patent Application Publication No. 2012/0287323, entitled: "Imaging apparatus with dual switchable beam deflectors", by Border et al.; and to commonly assigned, co-pending U.S. Patent Application Publication No. 2012/0287327, entitled: "Capturing images using a switchable imaging apparatus", by Border et al., each of which is incorporated herein by reference.

FIELD OF THE INVENTION

This invention pertains to the field of image capture and display and more particularly to a device that uses a set of switchable beam deflector to provide both image capture and display functions.

BACKGROUND OF THE INVENTION

Devices that integrate the functions of both display and image capture have been proposed for use in videoconferencing and other functions, as described in commonly assigned U.S. Pat. No. 7,714,923 entitled "Integrated display and capture apparatus" to Cok et al. In such devices, the camera components used for image capture are integrally formed to share space with display components on the surface of the same screen. This advantageous arrangement helps to allow a more natural interaction between viewers positioned at their respective displays. The term "displays that see (DTS)" has been coined to describe a class of such devices.

Increased demand for more compact device packaging presents a particular challenge for DTS designs. To provide a handheld device of this type, such as a camera with a display visible to the subject, it is necessary to reduce device dimensions and weight as much as possible, without compromising its display or image capture functions.

With conventional optical solutions for camera optics, there are trade-offs between size and thickness of the DTS device and image quality. The optical path length can be severely constrained, increasing optical design complexity and cost. Placing one or more cameras behind the display screen can add significant thickness and bulk and may be impractical for a hand-held device. Positioning one or more cameras along edges of the display screen may alleviate some of the dimensional problems, but proves to be less satisfactory because the perspective of the camera is different from the perspective of a viewer who is observing the display.

In transparent displays, cameras in the display area obstruct the transparency of the display. While displays such as active matrix OLEDs (AMOLED) can be highly transparent, camera components such as an image sensor are typically opaque. What is needed is a method to capture an image from the perspective of the center of the display while locating the opaque components of the camera at the edge of the display. In the paper "Liquid Crystal Based Optical Switches" by Semenova et al (Journal of Molecular Crystals and Liquid Crystals, Vol. 413, pp. 385-398, 2004), optical switches are provided that redirect light when activated. However, the optical switches described are dependent on the light being polarized and prisms are used to increase the angular redirection of the optical switch. As such, the optical switches described are not suited for use in a transparent display because the light interacting with the display is not polarized and prisms would distort the transparent view through the transparent display.

U.S. Pat. No. 4,385,799 to Soref, entitled "Dual array fiber liquid crystal optical switches," presents an optical switch for telecommunications that is based on liquid crystals. In this case, a reflection from a liquid crystal layer is used to interrupt a beam of light. As such, a small deflection of the beam of light is sufficient to interrupt the beam and switch OFF the telecommunication. The deflection provided by this optical switch, however, is slight, and is too small to be used in a transparent display.

U.S. Pat. No. 5,018,835 to Dorschner, entitled "Deflector for an optical beam including refractive means," provides a deflector for an optical beam based on a liquid crystal layer. In this patent, a prism element is combined with a series of stripe electrodes to deflect an optical beam by different amounts.

U.S. Pat. No. 6,999,649 to Chen, entitled "Optical switches made by nematic liquid crystal switchable mirrors, and apparatus of manufacture," provides a similar deflector which includes a prism element to increase the angle of deflection. Since these deflectors utilize prism elements, they would provide distorted views through transparent displays.

U.S. Pat. No. 6,687,030 to Popovich et al., entitled "Method and apparatus for illuminating a display," discloses an image generating apparatus including a switchable light-directing apparatus. In response to a control signal, the switchable light-directing apparatus directs portions of received light onto different regions of an image plane.

U.S. Pat. No. 6,885,414 to Li, entitled "Optical router switch array and method for manufacture," discloses an optical router switch array including a plurality of individually switchable mirror elements. The switchable mirror elements are made using liquid crystal holographic gratings.

Although various configurations have been proposed for providing a DTS design, conventional solutions fall short of a solution that reduces the physical profile of the device, provides alignment between the perspective of the camera and the perspective of the display as observed by a viewer, and conceals or masks image capture components from visibility to the viewer who is also being imaged. Thus, it is seen that there is a need for an improved DTS design that addresses these difficulties.

SUMMARY OF THE INVENTION

The present invention represents a switchable imaging apparatus having an image display mode and an image capture mode, comprising:

a display screen having a first display state and a second transparent state wherein the display screen is at least partially transparent, the display screen having a front side oriented toward a scene and an opposing back side and including an array of display pixels energizable to provide a displayed image when the display screen is in the first display state;

an array of optical beam deflectors, each optical beam deflector being individually switchable between a first non-deflecting state and a second deflecting state, such that when a particular optical beam deflector is in the first non-deflecting state, light from the scene passes through the particular optical beam deflector in an undeflected direction, and when the particular optical beam deflector is in the second deflecting state, light from a corresponding section of the scene is deflected from a first optical axis perpendicular to the display screen onto a second optical axis parallel to the display screen;

a camera positioned along the second optical axis in a location peripheral to the display screen; and a controller which synchronously switches the display screen between the first display state and the second transparent state, and the individual optical beam deflectors between their first non-deflecting state and their second deflecting state, and initiates capture of images by the camera thereby providing the image display mode and the image capture mode.

This invention has the advantage that a combined display and image capture device is provided with a reduced thickness dimension. The switchable imaging apparatus provides for images of the viewer to be captured with direct eye-contact through the display.

It has the additional advantage that it allows the switchable imaging apparatus to be very nearly transparent during image capture, without making the camera components visible to the subject. This allows the person taking the image to use the display itself as the "viewfinder" for a more natural image capture session.

It has the further advantage that using a plurality of optical beam deflectors can provide an increased field of view relative to that which would be possible for a single optical beam deflector given a particular device geometry.

BRIEF DESCRIPTION OF THE DRAWINGS

FIG. 3A shows a cross-sectional view of a transparent plate incorporating a switchable beam deflector;

FIG. 3B shows a cross-sectional view of a switchable imaging apparatus;

FIG. 5A shows a cross sectional view of a switchable imaging apparatus operating in an image display mode;

FIG. 5B shows a cross sectional view of the switchable imaging apparatus of FIG. 5A operating in an image capture mode;

FIG. 6D illustrates a fourth configuration for using the switchable imaging apparatus of FIG. 6B in a teleconference application;

FIG. 8A shows a cross sectional view of a switchable imaging apparatus operating in an image display mode according to an alternate embodiment using an array of individually switchable beam deflectors;

FIG. 8B shows a cross sectional view of the switchable imaging apparatus of FIG. 8A operating in an image capture mode;

It is to be understood that the attached drawings are for purposes of illustrating the concepts of the invention and may not be to scale.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Embodiments of the present invention utilize one or more switchable layers of transparent material that change from a low refractive index state to a high refractive index state when exposed to an electromagnetic field. The switchable layers of transparent material are positioned inside a substrate of transparent material to form a switchable optical beam deflector. The materials are chosen so that the substrate material has substantially the same refractive index as the switchable layers of transparent material when they are in their high refractive index state. As a result, the switchable beam deflector is substantially transparent when the switchable layers of transparent material are in their high refractive index state, since the substrate materials have the same refractive index. Conversely, when the switchable layers of transparent material are in their low refractive index state, the refractive indices of the substrate materials are not the same and the switchable beam deflector is not fully transparent, as some of the light passing through the plate will be reflected by total internal reflection (TIR).

TIR occurs when a ray of light, traveling through a material with a first refractive index $n_1$, is incident on a surface of another material having a lower second refractive index $n_2$, and the incident angle of the ray of light is at or above a critical angle $\theta_c$, with respect to a normal to the surface. The critical angle $\theta_c$ is defined in Eq. (1) below:

$$\theta_c = \sin^{-1}(n_2/n_1) \quad (1)$$

Figure 1:
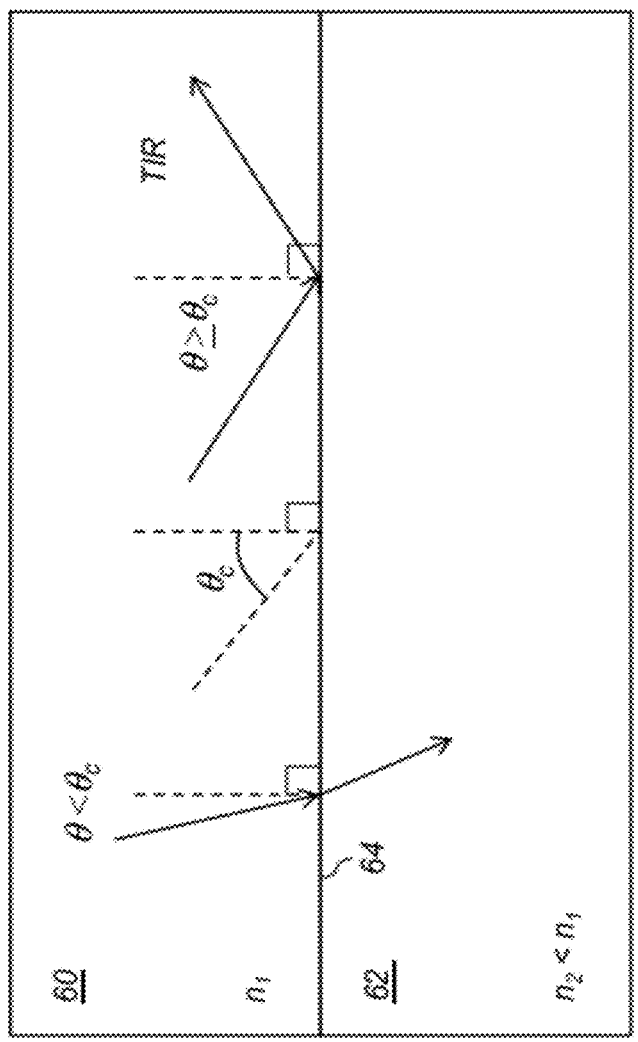
FIG. 1 is an illustration of the Total Internal Reflection (TIR) principle that is used for a switchable beam deflector in accordance with the present invention.

FIG. 1 shows the TIR principle in schematic form for light traveling from a first material 60 having a first refractive index $n_1$ and incident on a second material 62 having a lower second refractive index $n_2$. At angles less than the critical angle ($\theta<\theta_c$), the light travels through the interface 64 between first and second materials 60 and 62, with some redirection due to refraction, as shown. At angles greater than or equal to the critical angle ($\theta \geq \theta_c$), the light is fully reflected at the interface by TIR. TIR is used, for example, in optical fibers and in other optical applications, because it is highly efficient, reflecting substantially all of the incident light under the given conditions.

A number of materials are capable of being switched between different refraction indices in response to an applied electromagnetic signal. In particular, various types of liquid crystal materials are known to exhibit measurable changes in optical refractive index for only modest changes in an applied electric field. This principle has been described for use in various types of electro-optical switches, such as those described in U.S. Pat. No. 4,278,327 to McMahon et al., entitled "Liquid Crystal Matrices," for example. A typical difference in refractive index, $\Delta n$, is in the range of about 0.05 to 0.5 for different types of liquid crystal materials. Consistent with an embodiment of the present invention, one or more layers of liquid crystal materials are embedded within a transparent substrate and provided with a switching signal that enables switching between two refractive indices to provide light redirection within beam deflector.

Figure 2B:
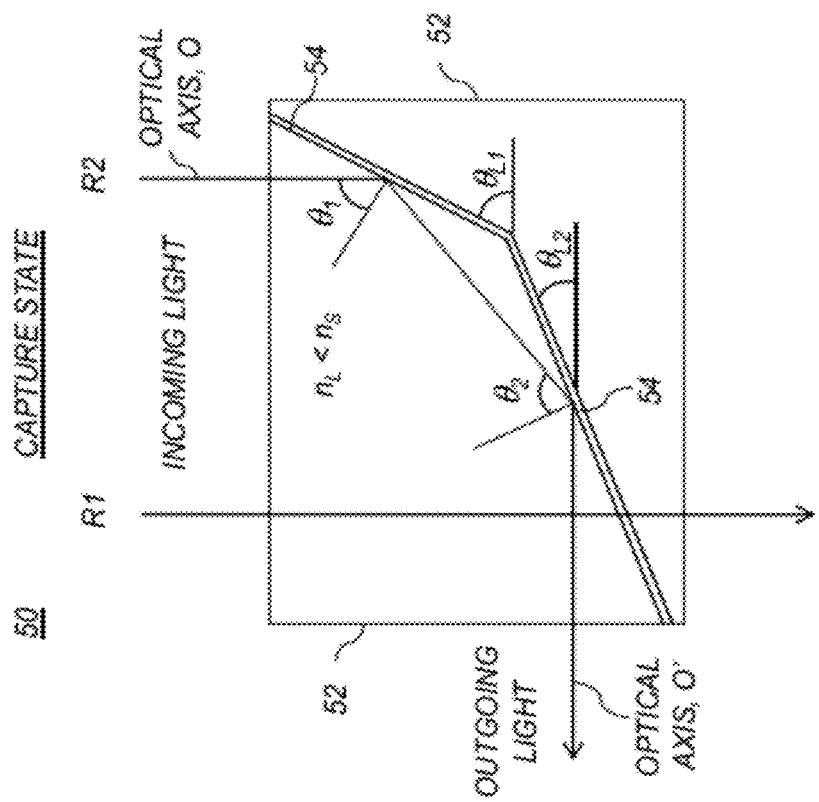
FIG. 2B shows a cross-sectional view of a switchable beam deflector in a deflecting state.
Figure 2A:
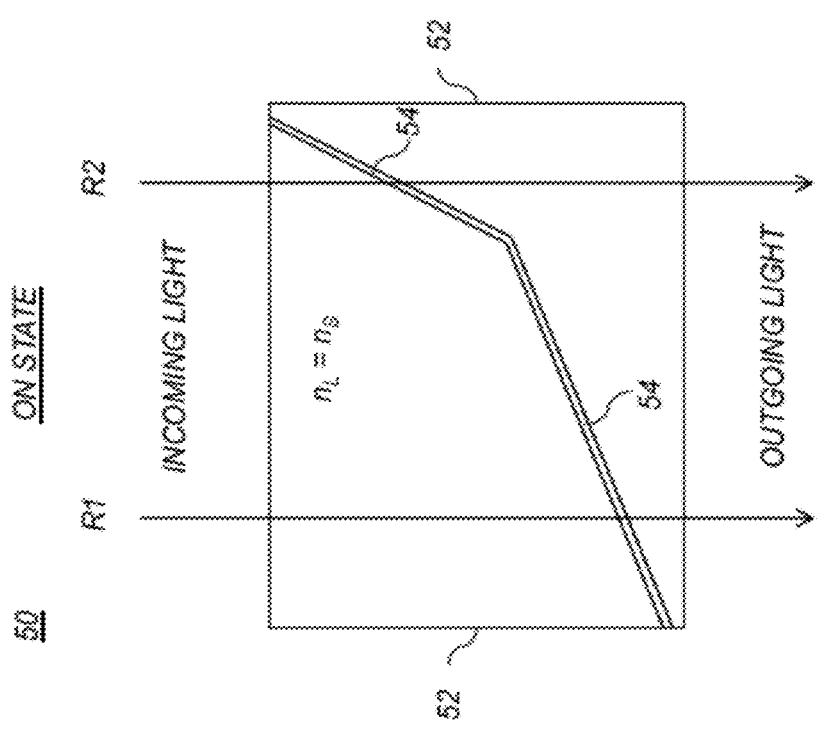
FIG. 2A shows a cross-sectional view of a switchable beam deflector operating in a non-deflecting state.

FIGS. 2A and 2B are schematic diagrams showing a switchable optical beam deflector 50 in non-deflecting and deflecting states, respectively, based on electrical signals applied according to instructions from a controller. A transparent substrate 52 has one or more liquid crystal layers 54 of a liquid crystal material. The liquid crystal layers 54 have a switchable refractive index that can be switched in response to an applied voltage signal. In FIG. 2A, application of a first voltage signal (e.g., V=0) causes a refractive index $n_L$ of the liquid crystal layers 54 to closely match a refractive index $n_S$ of the substrate 52 (or at least to match closely enough so that the critical angle $\theta_c = \sin^{-1}(n_L/n_S)$ is greater than the angle of incidence $\theta_1$ for an incoming light ray R1.) In this configuration, incoming light, shown along parallel rays R1 and R2, is transmitted undeflected through the interface between the liquid crystal layers 54 and the substrate 52. As will be described later, this condition can be used to provide a "display state" for a switchable imaging device, wherein the incoming light can be modulated to provide a displayed image.

In FIG. 2B, application of a second voltage signal (e.g., V=$V_0$) causes the refractive index $n_L$ of the liquid crystal layers 54 to be lower than the refractive index $n_S$ of the substrate 52. This causes TIR for light along ray R2, because it is incident on the liquid crystal layer 54 at an angle of incidence $\theta_1$ larger than the critical angle $\theta_c$. Light along ray R1 is not incident on the liquid crystal layer 54 at an angle larger than the critical angle $\theta_c$, and thus passes through the liquid crystal layer 54 substantially undeflected.

As shown by the redirected path of ray R2 in FIG. 2B, multiple layers 54, oriented at different angles, can be used to deflect the incident light by a greater amount. In the present invention the incident light on optical axis O is deflected by 90° to a redirected optical axis O' so that incoming light from the scene in front of the device can be directed to a camera or other type of image sensor, thereby providing a "capture state" for the switchable imaging apparatus.

Examining the path of light ray R2 in FIG. 2B, it can be seen that when TIR conditions are met, the layers 54 act as mirrors that each provide deflections of twice the angle between the input ray and the interface. As a result, it can be shown that the desired 90° deflection is obtained provided that TIR conditions are met with angles of incidence of $\theta_1=\theta_2=90°-90°/4=67.5°$. Thus the critical angle must be $\theta_c \leq 67.5°$. However, it should be noted that since liquid crystal layers are typically polarization-sensitive, the deflection of the light ray R2 will occur only for one of the polarization states present in the incoming light, the light with the other polarization state will not be affected by the liquid crystal layer 54 and as such will pass through the liquid crystal layer 54 similar to light ray R1. In this configuration, the angles of incidence $\theta_1=\theta_2=67.5°$ are provided when the liquid crystal layers are oriented at $\theta_{L1}=67.5°$ and $\theta_{L2}=22.5°$. However, it will be obvious to one skilled in the art that other arrangements can be used to provide the desired 90° deflection of the incoming light ray.

FIG. 3A is a schematic diagram showing cross-sectional view of a transparent plate 110 incorporating a switchable beam deflector 50 that can be used in accordance with various embodiments of the present invention. The switchable beam deflector 50 includes two liquid crystal layers 54 similar to those shown in FIGS. 2A and 2B. The transparent plate 110 is made from three transparent plate sections 111a, 111b and 111c to simplify construction and allow for transparent electrodes 113a and 113b to be applied to the opposite sides of thin cavities provided for the liquid crystal layers 54. Preferably, alignment layers are also provided in the thin cavities as is well known by those skilled in the art but are not shown in the drawings. After the transparent plate sections 111a, 111b and 111c have been manufactured and coated with transparent electrodes 113a and 113b, and the liquid crystal layers 54 are positioned in the thin cavities, the transparent plate sections 111a, 111b and 111c are bound together and sealed to enclose and protect the liquid crystal. In some embodiments, sealing can be provided by thin transparent plates (not shown) that cover the front side and back side of the transparent plate 110.

FIG. 3B is a schematic diagram showing cross-sectional view of a switchable imaging apparatus 120 incorporating the transparent plate 110 of FIG. 3A according to one embodiment. The switchable imaging apparatus 120 has a transparent viewing mode for viewing a scene and an image capture mode for capturing an image of the scene. The imaging apparatus 120 includes a controller 40 for controlling the switchable beam deflector 50. The controller 40 is connected to the transparent electrodes 113a and 113b using control wires 44. By controlling the voltage difference between the transparent electrodes 113a and 113b, the controller 40 can control the refractive index of the liquid crystal layers 54, thereby enabling the switchable beam deflector 50 to be switched between the first non-deflecting state and the second deflecting state.

When the switchable beam deflector 50 is controlled to operate in the first non-deflecting state, the switchable beam deflector 50 is transparent in order to provide the transparent viewing mode for the switchable imaging apparatus 120. In this mode, a viewer can view the scene by looking through the transparent plate 110, much as one would look through a glass window.

When the switchable beam deflector 50 is controlled to operate in the second deflecting state, light is deflected by TIR from the liquid crystal layers 54 so that light from a first optical axis O perpendicular to the surface of the transparent plate 110 and extending from the front side of the switchable imaging apparatus 120 is deflected onto a second optical axis O' parallel to the surface of the transparent plate 110. The deflected light is directed onto a camera 34, in order to provide the image capture mode for the switchable imaging apparatus 120. In the context of the present invention, the "front side" of the switchable imaging apparatus 120 is defined to be the side facing toward the scene being imaged when the switchable imaging apparatus 120 is being operated in the image capture mode. Similarly, the "back side" is defined to be the opposite side facing away from the scene.

The camera 34 is preferably a digital camera and includes imaging optics 32 and an imaging sensor 33, and is configured to capture an image of the scene over a field of view 18. The imaging sensor 33 includes an array of image sensor pixels, and can be any of a number of types of image sensing devices that are known in the art. Examples of typical image sensing devices that can be used in accordance with the present invention include charge-coupled devices (CCD) or complementary metal-oxide semiconductor (CMOS) devices. The array of image sensor pixels will generally be a two-dimensional array, although in some embodiments a one-dimensional array can be used.

The switchable imaging apparatus 120 will generally include other electronic and mechanical components providing various features such as user interface controls, supply of electrical power, image processing operations, storage of captured images and connectivity with other devices. The transparent plate 110 can be positioned in a variety of frame configurations (not shown). The camera 34, the controller 40 and the other associated components are preferably built into the frame used to enclose the transparent plate 110.

Figure 4:
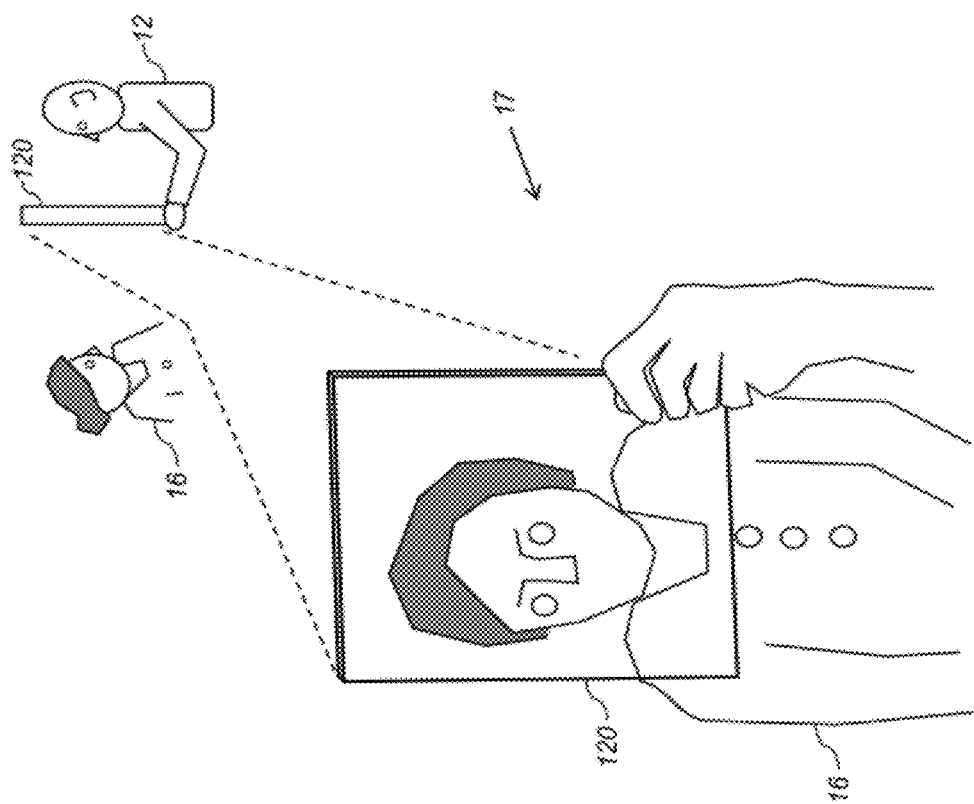
FIG. 4 illustrates a configuration for using the switchable imaging apparatus of FIG. 3B.

FIG. 4 illustrates the use of the switchable imaging apparatus 120 of FIG. 3B by a photographer 12 to capture an image of a subject 16. As the photographer 12 prepares to capture the image, the switchable imaging apparatus 120 is controlled to be in the transparent view mode so that from the photographer's view 17, the switchable imaging apparatus 120 appears to be a transparent window, through which the subject 16 can be seen. When the photographer 12 has positioned the switchable imaging apparatus 120 properly and is satisfied with the pose of the subject 16, an image capture control such as a "shutter button" (not shown) can be activated to initiate capture of the image. In response to activation of the image capture control, the controller 40 (FIG. 3B) switches the switchable beam deflector 50 (FIG. 3B) to operate in the deflecting mode, which deflects light from the scene into the camera 34 (FIG. 3B), which then captures the desired image. The switchable beam deflector 50 only needs to be switched to the deflecting mode for the fraction of a second required to capture the image, then it can be returned to the non-deflecting mode for the transparent viewing state. For video capture applications, the switchable beam deflector 50 can be alternately switched between the deflecting state for the image capture mode and the non-deflecting state for the image display mode (or the transparent view mode) at rates suitable to capture motion video.

FIGS. 5A and 5B are schematic diagrams showing cross-sectional views of a switchable imaging apparatus 10 according to a second embodiment. In this embodiment, the switchable imaging apparatus 10 incorporates a display screen 20 positioned between the scene and the optical beam deflector 50 such that the imaging light passes through the display screen 20 before being deflected by the optical beam deflector 50. The display screen 20 can be switched to provide both an image display mode (as shown in FIG. 5A) and an image capture mode (as shown in FIG. 5B). The switchable imaging apparatus 10 is similar to the imaging device 120 from FIG. 3B, except for the addition of the display screen 20 and an optional light blocking layer 36. In some configurations, the light blocking layer 36 can be omitted, or a transparent layer can be used in place of the light blocking layer 36.

The switchable imaging apparatus 10 includes a switchable beam deflector 50, such as that described in FIG. 3A. In the illustrated configuration, the transparent plate 110 incorporating the switchable beam deflector 50 is sized such that it is only as large as the switchable beam deflector 50. The remaining region between the display screen 20 and the light blocking layer 36 is filled by an air gap 56. In other embodiments, the transparent plate 110 can extend to fill the entire region between the display screen 20 and the light blocking layer 36.

The display screen 20 includes an array of display pixels energizable to provide a displayed image when the display screen is in a first display state. The display screen 20 should be at least partially transparent when the display screen 20 is switched to a second transparent state where the display pixels are not energized so that light can be deflected by the switchable beam deflector 50 into the camera 34. One type of display technology that can be at least partially transparent is an Optical Light Emitting Diode (OLED) display, such as that provided in the Mobile Display from Samsung, Seoul, Korea.

The switchable imaging apparatus 10 will generally include other electronic and mechanical components providing various features such as user interface controls, supply of electrical power, image processing operations, storage of captured images and connectivity with other devices. As with the switchable imaging apparatus 120 described earlier, these components can be built into a variety of frame structure that surrounds the display screen 20.

In FIG. 5A, the switchable imaging apparatus 10 is shown operating in the image display mode. In the image display mode, the controller 40 controls the switchable beam deflector 50 to operate in its non-deflecting state and the display screen 20 to operate in its display state where the display pixels are energized to provide a displayed image. By controlling the switchable beam deflector 50 to operate in the non-deflecting state when images are displayed, a higher quality image can be displayed without shadows that would be caused if the switchable beam deflector 50 were switched to the deflecting state.

In some embodiments, the optional light blocking layer 36 is used to provide a uniform background behind the display. This prevents objects behind the switchable imaging apparatus 10 from being visible through the displayed image. The light blocking layer 36 can be an opaque light blocking layer, such as a black layer or a white layer. In other embodiments, the light blocking layer can be a light scattering layer, such as an optical diffuser.

In some embodiments, the light blocking layer 36 is switchable between a light blocking state or light scattering state and a transparent state according to control signals received from the controller 40. In this way the switchable imaging apparatus 10 can be controlled to provide an optional transparent mode where the display screen 20 is controlled to operate in its transparent state, the switchable beam deflector 50 is controlled to operate in its non-deflecting state, and the light blocking layer 36 is controlled to operate in its transparent state. Methods for making switchable light blocking layers are known in the art. For example, a switchable light blocking layer that switches between a transparent state and a light scattering state can be made using the methods provided in U.S. Pat. No. 4,688,900 to Doane et al., entitled "Light modulating material comprising a liquid crystal dispersion in a plastic matrix." With this approach, the droplets of liquid crystal are enclosed in a clear plastic sheet. The material can be switched between a transparent state and a scattering state by switching between two different alignments for the birefringent liquid crystal molecules. Similarly, a switchable light blocking layer that switches between a transparent state and a light blocking state can be made using the methods described in U.S. Pat. No. 3,499,702 to Goldmacher, entitled "Nematic liquid crystal mixtures for use in a light valve." With this approach the polarization state of liquid crystal layers is rotated so that light is alternately controlled to be passed or blocked. Alternately, pleochroic dyes can be combined with liquid crystal materials to switch between a transparent state and an absorbing state.

When the display screen 20 is operating in its display state, the light blocking layer 36 can optionally be switched between its transparent state and its light blocking/light scattering state according to the requirements of a particular application or according to a specified user preference. If the light blocking layer 36 is controlled to operate in its transparent state while the display screen 20 is in its display state, the result will be a semi-transparent image display where the background is visible through the displayed image. If the light blocking layer 36 is controlled to operate in its light blocking/light scattering state while the display screen 20 is in its display state, the background will not be visible through the displayed image.

In FIG. 5B, the switchable imaging apparatus 10 is shown operating in the image capture mode. In the image capture mode, the controller 40 controls the switchable beam deflector 50 to operate in its deflecting state and the display screen 20 to operate in its transparent state (at least in the area of display pixels covering the field of view 18 for the switchable beam deflector 50). In the image capture mode, light is deflected by the switchable beam deflector so that light from the first optical axis O which is perpendicular to the display screen 20 and extends out of the front side of the display screen, is deflected onto the second optical axis O', which is parallel to the display screen 20. The deflected light is directed onto the camera 34, which captures an image of the scene over the field of view 18.

Figure 6A:
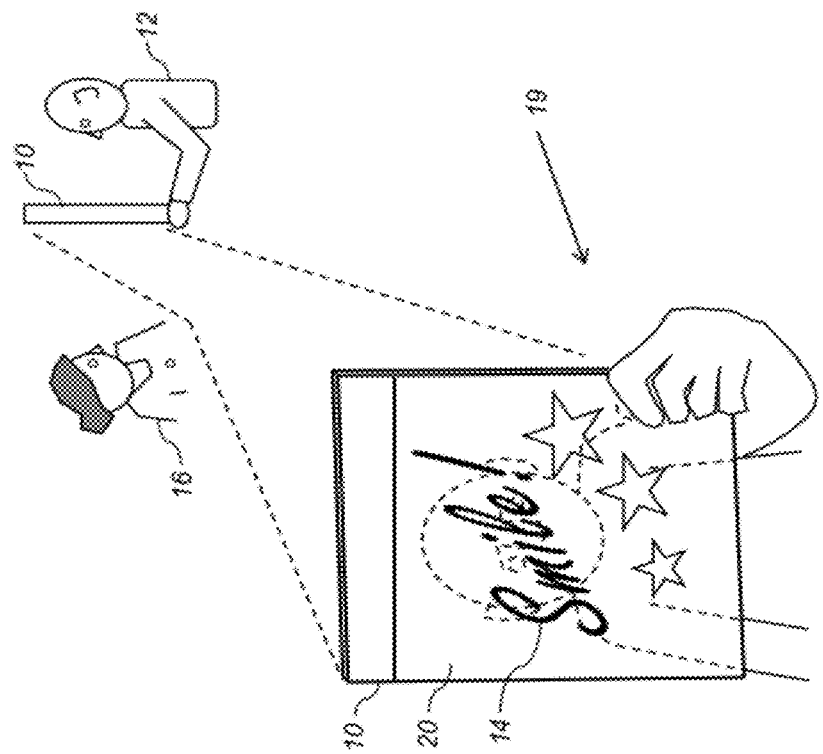
FIG. 6A illustrates a first configuration for using the switchable imaging apparatus of FIG. 6B in a photography application.

The switchable imaging apparatus 10 shown in FIGS. 5A and 5B can be used for a variety of applications. For example, in FIG. 6A the switchable imaging apparatus 10 is used by photographer 12 to capture an image of subject 16. In this application, the switchable imaging apparatus 10 is set to operate in the image display mode during the time that the photographer 12 is composing the image and waiting for the subject 16 to have an attractive smile. The display screen 20 can be activated to display an image 14 to the subject 16 during this process as illustrated by the subject's view 19. For example, the displayed image 14 can include a text message giving instructions to the subject 16 (e.g., "Smile!"). The text message capability can also be used to enable a number of different applications. For example, the switchable imaging apparatus 10 can be used to present scrolling text for teleprompter or karaoke applications, while simultaneously capturing video or still images of the subject 16. This has the advantage that the subject 16 will be looking directly into the camera while he/she is reading the text.

Alternately, the displayed image 14 can provide a preview image showing the subject 16 what she looks like so she can adjust her pose appropriately. (This can be particularly convenient for enabling the photographer 12 to capture a self-portrait by orienting the display screen 20 to point toward himself) In order to capture the preview image, the switchable imaging apparatus 10 can be configured to rapidly alternate back and forth between the image capture mode and the image display mode. An image can then be captured with the switchable imaging apparatus 10 is in the image capture mode, and can be displayed on the display screen 20 after the switchable imaging apparatus 10 has switched back to the image display mode. The captured image is represented by an array of pixel values, and is displayed by energizing the display pixels of the display screen 20 in accordance with the pixel values of the captured image. If the image capture mode and the image display mode are alternated at a high enough temporal frequency, the subject 16 will not notice any observable flicker (e.g. 60 Hz).

When the photographer 12 is satisfied with the pose of the subject 16, an image capture control (not shown) can be activated to initiate capture of the image. In response to activation of the image capture control, the controller 40 (FIG. 5B) switches the switchable imaging apparatus 10 to operate in the image capture mode and captures the desired image. The switchable imaging apparatus 10 only needs to be switched to the image capture mode for the fraction a second required to capture the image, then it can be returned to the image display mode where the captured image can then be displayed on the display screen 20.

The switchable imaging apparatus 10 can also be used for a wide variety of other applications. For example, U.S. Pat. No. 7,003,139 to Endrikhovski et al., entitled "Method for using facial expression to determine affective information in an imaging system," and U.S. Pat. No. 7,233,684 to Fedorovskaya et al., entitled "Imaging method and system using affective information," both of which are incorporated herein by reference, teach that a user's facial expression can be monitored while viewing an image in order to automatically infer user image preferences. This approach can be used to automatically tag images with metadata indicating the user's positive or negative response to the viewed images. In this scenario, the images to be viewed can be presented on the display screen 20 for viewing by the subject 16. The facial expression of the subject 16 can then be monitored by capturing images using the camera 34 (FIG. 5A). The determined metadata tags can then be displayed on the display screen 20 (e.g., as a numeric or text representation, or as a "star rating").

Similarly, U.S. Pat. No. 7,046,924 to Miller et al., entitled "Method and computer program product for determining an area of importance in an image using eye monitoring information," and U.S. Pat. No. 7,206,022 to Miller et al., entitled "Camera system with eye monitoring," both of which are incorporated herein by reference, teach that eye gaze can be monitored while a user is viewing an evaluation image to determine what part of the image a user is interested in. The switchable imaging apparatus 10 can be used to enable these applications by capturing images of the subject 16 while he/she is viewing the evaluation image displayed on the display screen 20. The captured images of the subject 16 can then be monitored to determine the eye gaze pattern. Once the eye gaze pattern has been determined, this information can be used for a variety of purposes. In some embodiments, the evaluation image can be adjusted in response to the eye gaze pattern. Alternately, the image can be tagged with metadata indicating regions of interest in the image.

Figure 6B:
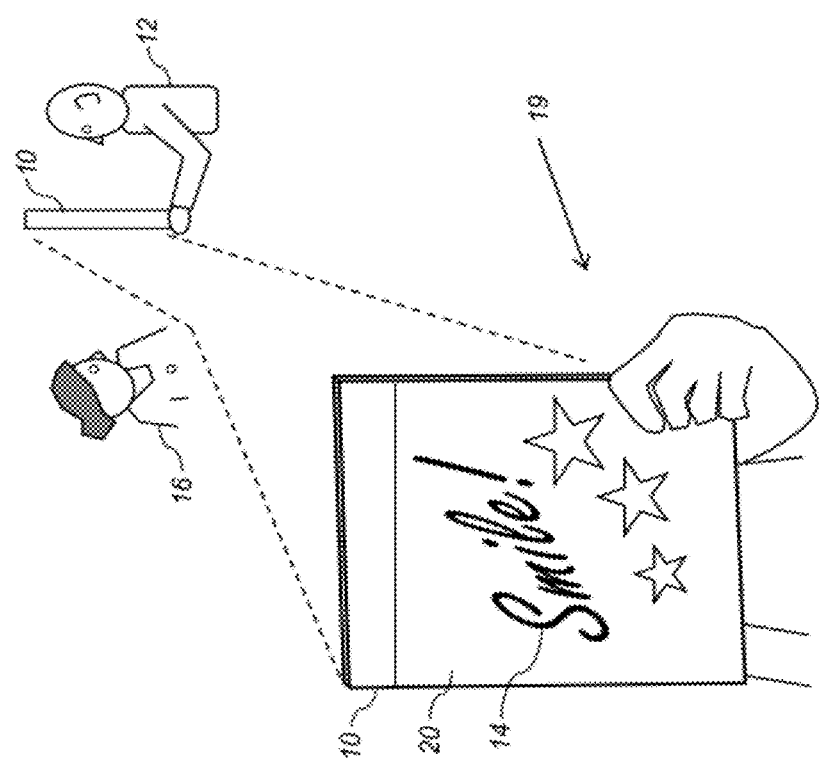
FIG. 6B illustrates a second configuration for using the switchable imaging apparatus of FIG. 6B in a photography application.

In configurations where the light blocking layer 36 is not included, or where the light blocking layer 36 can be switched to a transparent mode, the displayed image 14 can be semi-transparent allowing the photographer 12 to view the subject 16 (and likewise for the subject 16 to view the photographer 12) through the displayed image 14, as illustrated in FIG. 6B.

Figure 6C:
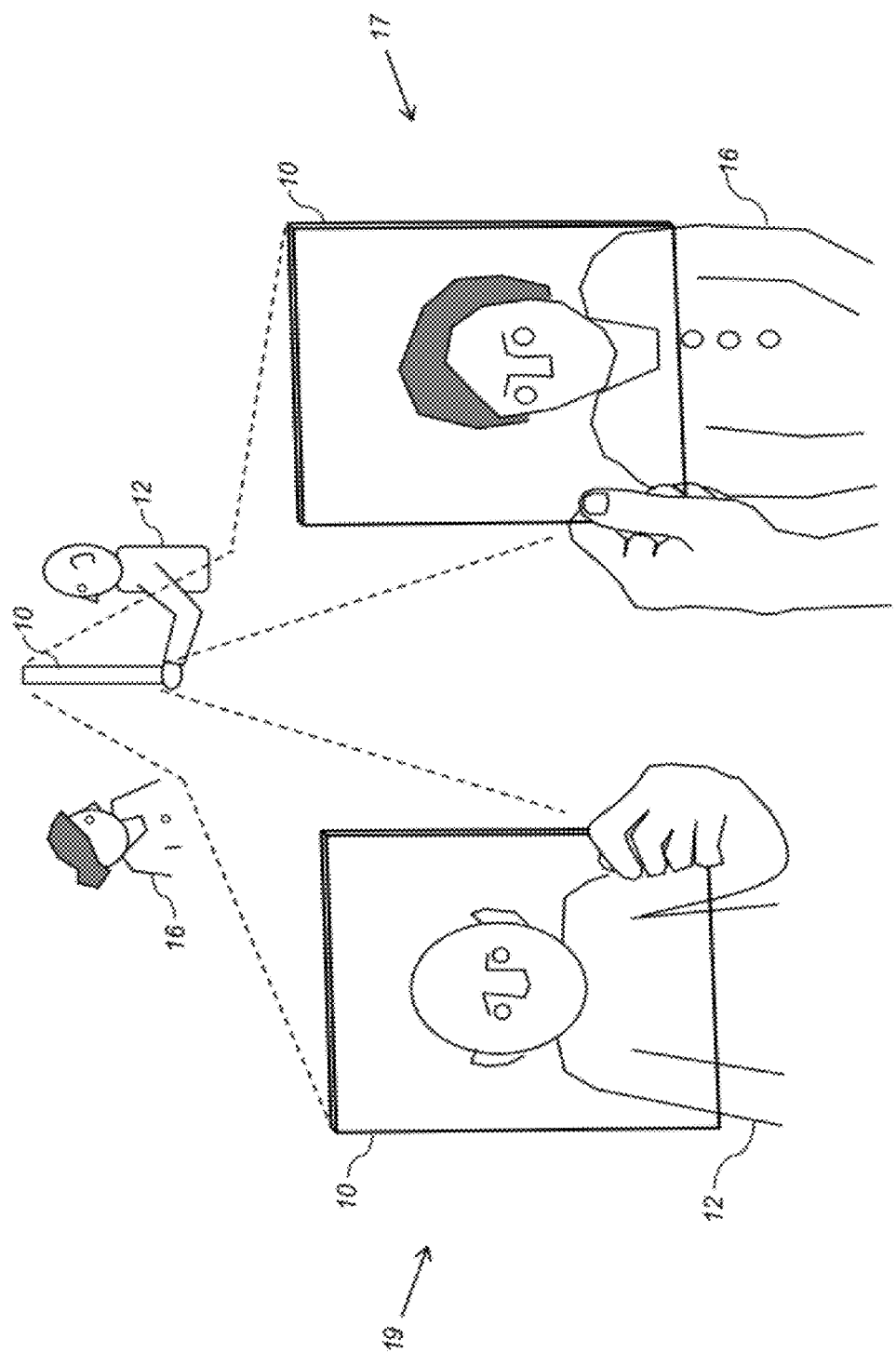
FIG. 6C illustrates a third configuration for using the switchable imaging apparatus of FIG. 6B in a photography.

FIG. 6C shows an alternate configuration where the switchable imaging apparatus 10 is controlled to operate in the optional transparent mode described early during the time that the photographer 12 is composing the image. In this case, from the subject's view 19, the subject 16 will be able to see the photographer 12 through the transparent switchable imaging apparatus 10, and from the photographer's view 17, the photographer 12 will be able to see the subject 16 through the transparent switchable imaging apparatus 10.

FIG. 6D shows a third example where the switchable imaging apparatus 10 of FIGS. 5A and 5B is used for a teleconferencing application. In this configuration a first person 13a has a first switchable imaging apparatus 10a, and a second person 13b has a second switchable imaging apparatus 10b. The first switchable imaging apparatus 10a and the second switchable imaging apparatus 10b include appropriate communications components that enable them to communicate with each other across a communications network 15. The communications network 15 can either be a wired network, or a wireless network such as a WIFI network or a cell phone communications network.

In this teleconferencing application, the first switchable imaging apparatus 10a and the second switchable imaging apparatus 10b are both set to rapidly alternate back and forth between the image display mode and the image capture mode. While the first switchable imaging apparatus 10a is controlled to operate in its image capture mode, it captures an image of the first person 13a. This image is then transmitted to the second switchable imaging apparatus 10b where it is displayed on its display screen as image 14b when the second switchable imaging apparatus 10b is controlled to be in its image display mode. Likewise, while the second switchable imaging apparatus 10b is controlled to operate in its image capture mode, it captures an image of the second person 13b. This image is then transmitted to the first switchable imaging apparatus 10a where it is displayed on its display screen as image 14a when the first switchable imaging apparatus 10a is controlled to be in its image display mode. Video communication is provided by capturing and transmitting the images back and forth at periodic intervals. An audio channel captured at the first switchable imaging apparatus 10a is also transmitted to the second switchable imaging apparatus 10b, and vice versa, to provide audio communication.

The teleconferencing application of FIG. 6D has an advantage over conventional teleconferencing systems in that the images captured of the persons 13a and 13b are captured from a viewpoint central to the corresponding display screen. Therefore, when each person is looking at the image of the other person on the display screen of their respective switchable imaging apparatus 10a and 10b, they will be looking directly into the optical axis of the camera. As a result, the image of the first person 13a will appear to be looking directly at the second person 13b and vice versa. In prior art teleconferencing systems, the image of the first person 13a appears to be looking in a different direction since the camera captures the image of the first person 13a from a different direction than the display where the first person 13a is looking (In conventional teleconferencing systems, the camera is typically positioned above the display.)

It should be noted that the switching behavior described with reference to FIGS. 5A and 5B can be performed using a wide variety of patterns suitable for operation of the switchable imaging apparatus 10 in various embodiments. In some cases, switching between the image display mode (FIG. 5A) and the image capture mode (FIG. 5B) can be initiated as needed, such as by a user instruction, for example. In other cases, the switching can be performed automatically, such as at a suitable switching frequency (e.g., 60 Hz) that allows switching to be imperceptible to the human viewer, substantially avoiding perceptible flicker in the displayed image. This can be useful for applications such as displaying a preview image of the scene during an image composition process, capturing a video sequence, using the imaging apparatus 10 to provide a video teleconferencing function, or for use in conjunction with text display (e.g., for the teleprompter or karaoke applications).

Figure 7B:
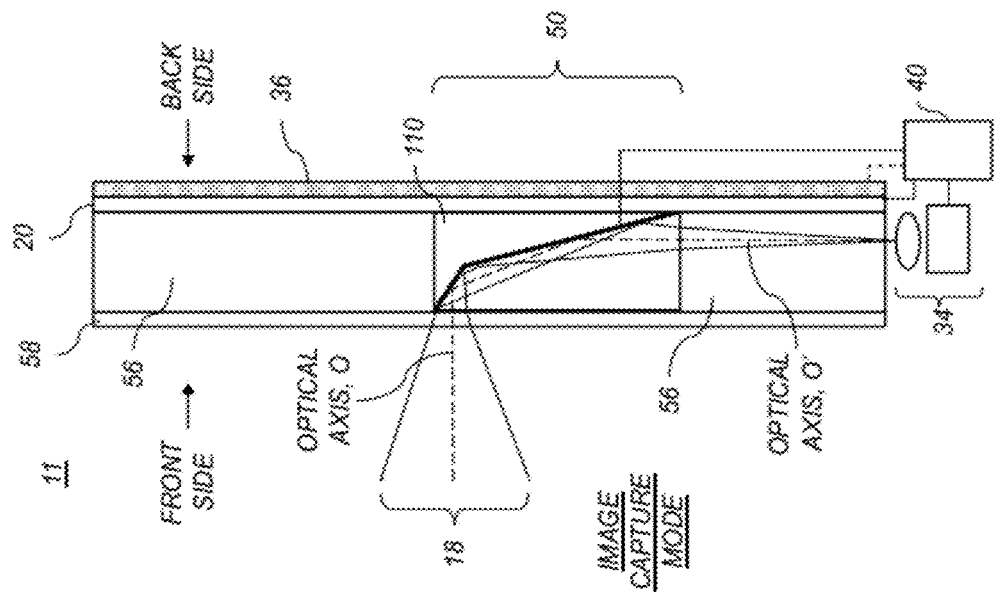
FIG. 7B shows a cross sectional view of the switchable imaging apparatus of FIG. 7A operating in an image capture mode.
Figure 7A:
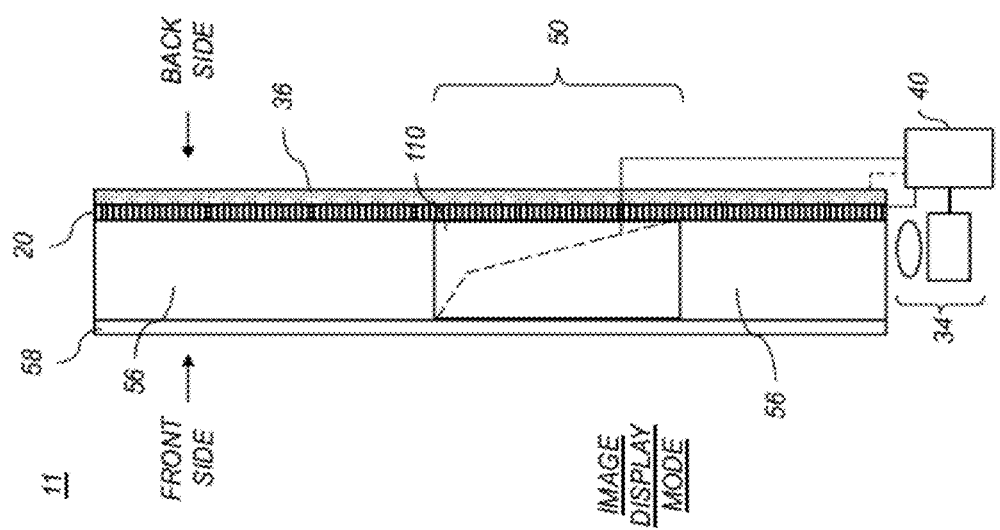
FIG. 7A shows a cross sectional view of a switchable imaging apparatus operating in an image display mode according to an alternate embodiment.

FIGS. 7A and 7B illustrate an alternate embodiment of a switchable imaging apparatus 11 where the optical beam deflector 50 is positioned between the scene and the display screen 20 such that the imaging light does not pass through the display screen 20 before being deflected by the optical beam deflector 50. In this configuration, the positions of the optical beam deflector 50 and the display screen 20 are reversed relative to the embodiment of FIGS. 5A and 5B. In this embodiment, an optional protective layer 58 can be provided in front of the switchable beam deflector 50 to protect the switchable beam deflector 50. The protective layer 58 can be a piece of transparent glass, for example.

When the switchable imaging apparatus 11 is controlled to operate in the image display mode (FIG. 7A) the switchable beam deflector 50 is set to operate in its non-deflecting state, so that it will be transparent and will not cast a shadow in the displayed image, and the display screen 20 is controlled to operate in its display state. In some embodiments, optional light blocking layer 36 can be used to block the light behind the display so that the displayed image will only be viewable from the front side. In other embodiments, the light blocking layer 36 can be excluded or can be switched to a transparent state so that the displayed image can be viewed from either the front or back side.

When the switchable imaging apparatus 11 is controlled to operate in the image capture mode (FIG. 7B) the switchable beam deflector 50 is set to operate in its deflecting state so that it will direct imaging light from the scene onto the camera 34, and the display screen 20 is controlled to operate in an off state. Alternately, when operating switchable imaging apparatus 11 in the image capture mode, the display screen 20 can continue to display an image with the result being that the image will be partially blocked in the area of the liquid crystal layers in the switchable beam deflector 50 during the fraction of a second required for the image to be captured. To compensate for this partial blockage of the displayed image, the brightness of the display pixels in the blocked area can be temporarily increased so that the image appears to have uniform brightness when operated in an alternating state of image capture and image display, or embodiments where a switchable light blocking layer 36 is used, it can be switched to a transparent state to provide a transparent view of the scene, or can be switched to a light blocking or light scattering state according to the desired behavior. For embodiments where it is not desired to support a state where the switchable imaging apparatus 11 appears to be transparent, one advantage of the FIG. 7A arrangement relative to the FIG. 5A arrangement is that the display screen 20 does not need to be transparent (or partially transparent) when it is not in its display state because the imaging light does not need to pass through it.

FIGS. 8A and 8B show an alternate embodiment of the invention in which a switchable imaging apparatus 70 uses an array of switchable beam deflectors 74. Each of the switchable beam deflectors 74 can use a similar arrangement of liquid-crystal layers 54, such as those described with reference to FIGS. 2A and 2B. In the embodiment shown, each switchable beam deflector 74 extends across at least a portion of the surface of imaging apparatus 70 in column-wise (or row-wise) fashion, and directs light from a section of the scene onto the camera 34. Each of the switchable beam deflectors 74 can be individually switched to their second deflecting state according to a sequential activation pattern to direct imaging light from the corresponding section of the scene onto the camera 34, thereby providing a set of partial images of the scene. The partial images can then be combined to form a complete image of the scene. In some cases, the partial images may overlap and the complete image can be formed by aligning the overlapping partial images. Pixel values for the complete image can be determined by averaging corresponding pixel values from the partial images in the overlap regions. This configuration has the advantage that using a plurality of switchable beam deflectors 74 can provide an increased field of view relative to that which would be possible for a single optical beam deflector given a particular device geometry.

In one configuration, each optical beam deflector in the set of optical beam deflectors extends in a direction parallel to one edge of the display screen 20, and is adapted to deflect light from a corresponding thin stripe of the scene into the camera 34. In this configuration, the imaging optics 32 can be a cylinder lens, and the imaging sensor 33 can be a linear sensor array.

To capture an image, the controller 40 sequentially switches one switchable beam deflector 74 at a time into its deflecting state, while switching all of the other switchable beam deflectors 74 into their non-deflecting states. The controller 40 also sets the display 20 (or at least a region of the display corresponding to the activated switchable beam deflector 74) to operate in its transparent state. In this way, a scanned image can be obtained as a succession of linear images, obtained one column (or row) at a time.

Figure 9:
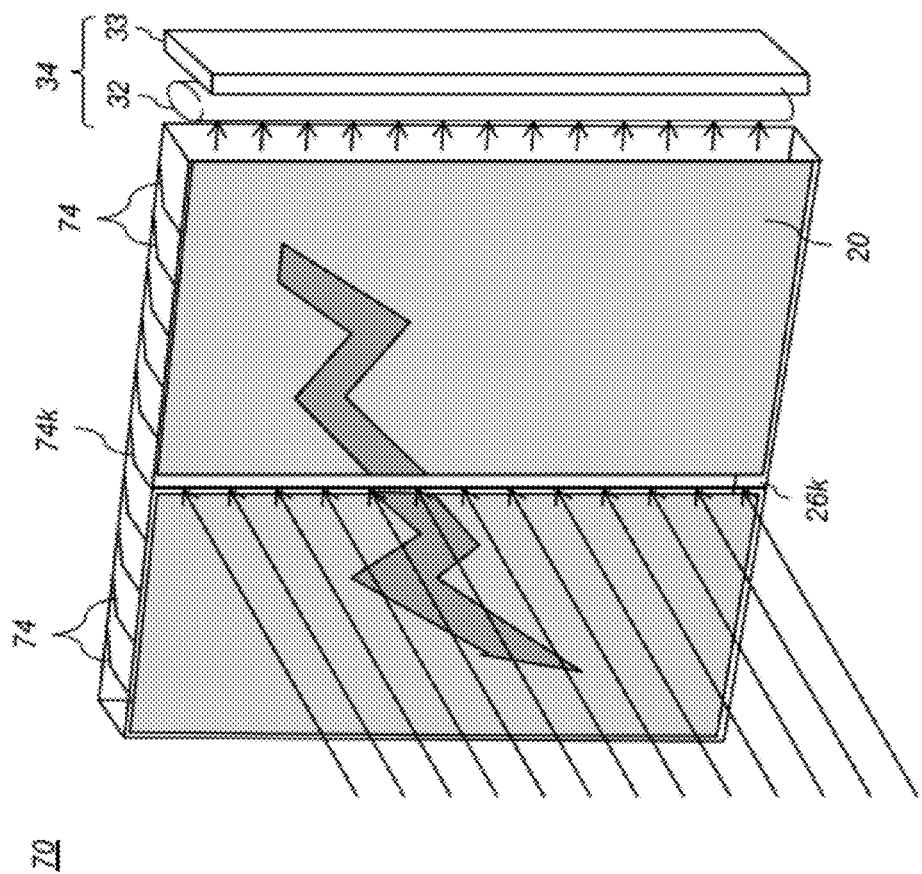
FIG. 9 illustrates a configuration for using the switchable imaging apparatus of FIGS. 8A and 8B.

FIG. 9 illustrates the case where the $k^{th}$ switchable beam deflector 74$k$ is set to its deflecting state while the rest of the switchable beam deflectors 74 are in their transparent non-deflecting states. As shown in FIG. 9, the displayed image is partially interrupted or blocked by the $k^{th}$ switchable beam deflector 74$k$ since it is in its deflecting state. The camera 34 in this embodiment is a linear device that can be one or more pixels wide by hundreds or thousands of pixels long, energizable to capture and provide image data for each vertical column (or horizontal row) of an image of the scene during the scan sequence.

In one scanning embodiment using the arrangement of FIG. 9, controller 40 (FIGS. 8A and 8B) synchronously switches a group of display pixels 26$k$ including one or more adjacent columns (or rows) of pixels in the display screen 20 to their transparent state at the same time that the corresponding switchable beam deflector 74$k$ is in its deflecting state. The rest of the display pixels in the display screen 20 are set to their display state and can be used to display an image during the scan sequence. By scanning in this way and obtaining one stripe of the image at a time, the embodiment shown in FIGS. 8A, 8B and 9 enables simultaneous display and image capture that, when performed at a high enough scanning frequency, can be essentially imperceptible to the viewing subject. That is, the viewing subject would see only the image displayed on the display screen 20, unaware that the scanning sequence described with reference to FIG. 9 was taking place.

Figure 10:
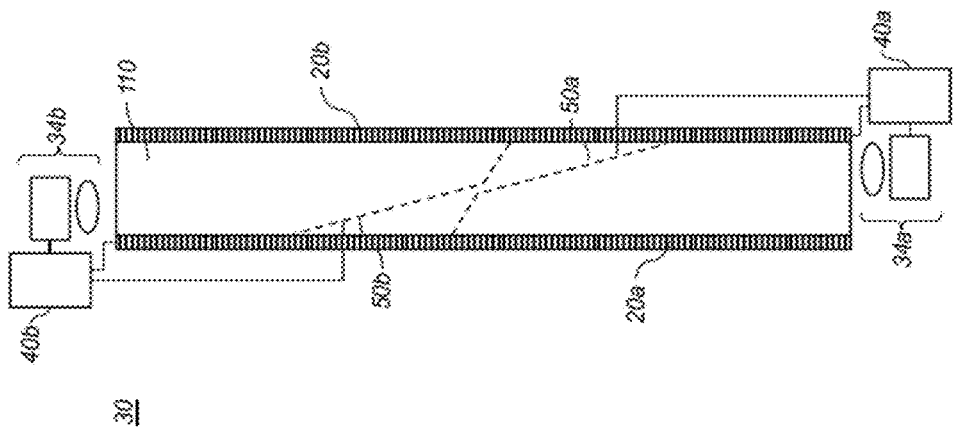
FIG. 10 shows a cross sectional view of a switchable imaging apparatus according to an alternate embodiment incorporating a pair of switchable beam deflectors oriented in opposite directions.

Another embodiment of the invention is shown in FIG. 10 which comprises a switchable imaging apparatus 30 that is capable of capturing images from two opposing sides simultaneously. The switchable imaging apparatus 30 includes a transparent plate 110 incorporating two switchable beam deflectors 50$a$ and 50$b$, which are fabricated in opposing orientations. The two switchable beam deflectors 50$a$ and 50$b$ are used to provide two independently switchable optical systems. One optical system obtains an image along optical axis Oa, with light redirected onto optical axis Oa' by the switchable beam deflector 50$a$, where the image is captured by camera 34$a$. The other optical system obtains an image along optical axis Ob, with light redirected onto optical axis Ob' by a switchable beam deflector 50$b$, where the image is captured by camera 34$b$. This example shows two controllers 40$a$ and 40$b$ for controlling the respective switchable optical systems. However, it will be clear to one skilled in the art that in other embodiments they can both be controlled by a single controller.

In an alternate embodiment, optical axis Ob' is coincident with the optical axis Oa' so that imaging light from both a first scene in the direction of the optical axis Oa and a second scene on the opposite side of the transparent plate 110 in the direction of the optical axis Ob can be redirected toward a single camera (e.g., camera 34$a$). In this configuration, an image of the first scene can be formed by controlling the switchable beam deflectors 50$a$ to be in the deflecting state, and an image of the second scene can be formed by controlling the switchable beam deflectors 50$b$ to be in the deflecting state.

Figure 11:
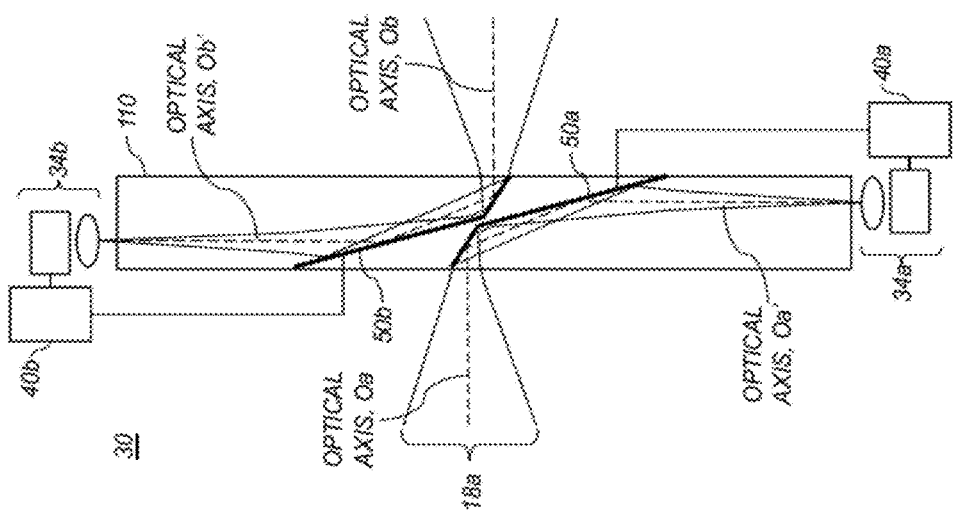
FIG. 11 shows a cross sectional view of a switchable imaging apparatus according to an alternate embodiment incorporating a pair of switchable beam deflectors oriented in opposite directions and a pair of display screens.

Referring to FIG. 11, in some embodiments, the transparent plate 110 of FIG. 10 can be sandwiched between two display screens 20$a$ and 20$b$, wherein each of display screens 20$a$ and 20$b$ can be controlled to provide a display state and a transparent state. An image can then be displayed on one or both of the display screens 20$a$ and 20$b$ when an image is not being captured by the respective switchable optical systems.

It will be recognized by one skilled in the art that the imaging apparatus configurations illustrated in FIGS. 10 and 11 which can be used to capture images in two different directions can be combined with the configuration of FIGS. 8A-8$b$ which used a set of sequentially activated switchable beam deflectors 74 to capture an image in a single direction. In this case a plurality of beam deflectors can be arranged to point in each of the two directions. An image of a first scene on a first side of the imaging apparatus can be captured by sequentially activating the beam deflectors oriented to deflect light from the first side, and an image of a second scene on a second side of the imaging apparatus can be captured by sequentially activating the beam deflectors oriented to deflect light from the second side.

The imaging apparatus configurations illustrated in FIGS. 10 and 11 can also be combined with various other features that have been described in the context of the other embodiments. For example, the light blocking layer 36 of FIGS. 8A and 8B can be added on either side of the transparent plate 110.

In the context of the present disclosure, the term "controller" is used to encompass a broad range of possible devices that can execute stored instructions and may include a dedicated logic processor or microprocessor or a more general purpose computer, such as a laptop computer or desktop workstation, for example. Controller 40 may also have a network connection to other processors or computers, wherein the network connection is wired or wireless. Controller 40 may perform some of the functions needed for image acquisition and display, while communicating with one or more other networked processors or computers for performing additional operations, such as additional image processing functions. The controller 40 will generally be communicatively connected to a storage memory. The storage memory can be used for image storage and for storage of executable instructions for causing the controller 40 controlling the operation of the switchable imaging apparatus.

In the context of the present disclosure, the term "memory" is used as a general term to encompass non-transitory tangible computer readable storage medium of both non-volatile and volatile types. A processor can include or interact with one or more types of storage media, for example; magnetic storage media such as magnetic disks (e.g., floppy disks or hard disks) or magnetic tape; optical storage media such as optical disk, optical tape, or machine readable bar code; solid-state electronic storage devices such as random access memory (RAM), or read-only memory (ROM); or any other physical device or media employed as a program memory to store a program having instructions for controlling one or more computers or processors to practice the method according to the present invention.

EXAMPLE 1

In a first exemplary embodiment, a switchable beam deflector 50 as shown in FIGS. 2A and 2B has two liquid crystal layers 54 made using liquid crystal material E63 from Merck. This liquid crystal material is switchable between refractive indices of $n_{L,e}$=1.74 and $n_{L,o}$=1.52 in response to an applied voltage signal. If the substrate 52 is fabricated with a material having a refractive index of $n_S$=1.74, this provides a critical angle $\theta_c$=60.9° when the refractive index of the liquid crystal material is at its lower value. The liquid crystal layers are positioned as shown in FIGS. 2A and 2B, with the layer nearer to the camera being oriented at an angle of $\theta_{L2}$=22.5°, and the layer further from the camera being oriented at an angle of $\theta_{L1}$=66.5°. With this arrangement, the light rays form consistent angles with the liquid crystal layers. The angle formed by the light rays and the normal to the surfaces of the liquid crystal layers of 67.5° is well above the critical angle $\theta_c$=60.9° for TIR behavior. The thickness of the liquid crystal layer should be larger than the penetration of an evanescent wave. For example, a thickness of 2-7 μm is commonly used in liquid crystal displays, and would work well for the liquid crystal layers 54 in the switchable beam deflector 50.

EXAMPLE 2

Similar to Example 1, using a liquid crystal material 18349 from Merck, which has refractive indices of $n_{L,e}$=1.80 and $n_{L,o}$=1.50. Assuming that the substrate 52 is fabricated with a material having a refractive index of $n_S$=1.50, the critical angle $\theta_c$=57.6, which is well below the angle formed by the light rays and the normal to the surfaces of the liquid crystal layers. Again, TIR conditions are provided.

EXAMPLE 3

A transparent plate 110 similar to that shown in FIGS. 3A and 3B was designed. In this design, the transparent plate 110 was 50 mm high (top-to-bottom dimension in FIG. 3A) and 10 mm thick (left-to-right dimension in FIG. 3A), and was made from an optical material with a refractive index of 1.53. If the switchable imaging apparatus 120 has a 16:9 format, the width of the transparent plate 110 (out-of-page dimension in FIG. 3A) would be 89 mm. This would correspond to a 50 mm×90 mm display with a diagonal dimension of approximately 4 inches, which is comparable to display sizes used for consumer digital cameras. The optical path between the bottom edge of the transparent plate where the camera is located and the center of the switchable beam deflector 50 is then 25 mm. The switchable beam deflector aperture provided by the liquid crystal layer that is closer to the camera is then effectively 5 mm in the thickness direction and the full width of the switchable beam deflector in the other direction.

For this example, a 16:9 format image was to be captured so the camera 34 was oriented with the narrow dimension of the imaging sensor 33 aligned to the 5 mm aperture. For an imaging sensor 33 with a 7.2 mm diagonal (½.5" format) and a 3.45 mm narrow dimension, considering the refraction effect provided by the transparent plate 110, the field of view as limited by the aperture of the switchable beam deflector 50 is then 17.5° in the narrow dimension and 36.5° in the diagonal dimension. This field of view corresponds to a 35 mm equivalent focal length of 65.7 mm which is between a wide angle and a telephoto arrangement. In addition, if the 17.5° field of view is imposed on top of the 66.5° incident angle provided in Example 1, the steepest incident angle in the field of view is then 66.5°-17.5°/2=57.75° which is above the critical angle of Example 2.

EXAMPLE 4

To further reduce the angle of incidence of the rays onto the liquid crystal layers, three liquid crystal layers can be provided rather than the two liquid crystal layer arrangement shown in FIG. 3A. This reduces the angle of incidence to 15° and the effective aperture provided by the switchable beam deflector is then ⅓ of the thickness of the transparent plate. The field of view associated with this arrangement is now 11.5°.

EXAMPLE 5

The design of Example 4 was further improved by having two adjacent switchable beam deflectors with slightly different angles of the liquid crystal layers so that adjacent fields of view are provided. In this way, images can be captured in sequential pairs and stitched together to form stitched images with substantially twice the field of view.

Figure 12:
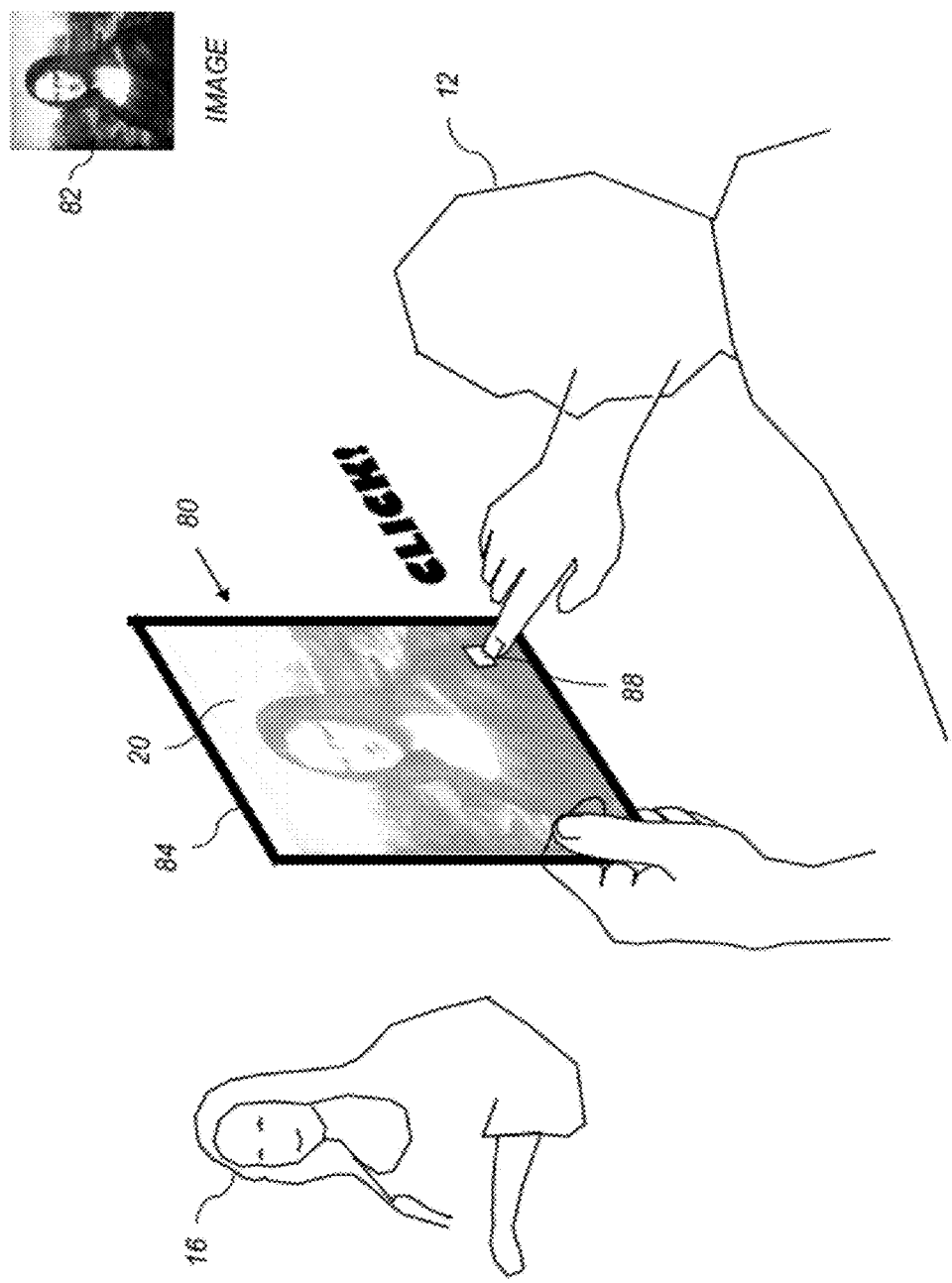
FIG. 12 illustrates a configuration for using a switchable imaging apparatus in accordance with the present invention.

Referring to FIG. 12, according to one embodiment of the present invention, a switchable image capture apparatus 80 having a transparent viewfinder mode is provided. Photographer 12 views subject 16 through image capture apparatus 80, which appears to be a transparent sheet of glass, within a frame 84. This helps to provide a more natural image capture session. Subject 16, in turn, may see photographer 12 through the image capture apparatus 80, as was described in FIG. 6C. In alternate embodiments, the subject 16 may see a blank screen or other image content displayed on display screen 20, depending on the setup of image capture apparatus 80. One or more user controls 88, are provided to enable the photographer to perform appropriate tasks. In some embodiments, the display screen 20 can be a touch sensitive surface so that the user controls 88 can be provided using touch-sensitive on-screen symbols that the photographer 12 can touch. In other embodiments, the user controls 88 can be positioned on the frame 84. The user controls 88 can include an image capture control that can be activate in order to capture an image 82. The user controls 88 can also include controls for performing zoom or focus adjustment, or to adjust various camera settings.

In one embodiment of the present invention, the image capture apparatus 80 behavior uses the following sequence:
  (i) transparent viewfinder mode for capturing images (in this mode the switchable beam deflector 50 is in its non-deflecting state, and the display screen 20 is in its transparent state);
  (ii) image capture mode initiated by activation of user control 88 (in this mode the switchable beam deflector 50 is in its deflecting state, and the display screen 20 is in its transparent state);
  (iii) image display mode for displaying the captured image, either for a predetermined time period or until instructed otherwise by the viewer (in this mode the switchable beam deflector 50 is in its non-deflecting state, and the display screen 20 is in its display state); and (iv) return to transparent viewfinder mode (i).

According to an alternate embodiment of the present invention, there is provided a transparent image capture apparatus 80 that employs switchable imaging apparatus 120 described with reference to FIG. 3B, which does not include display screen 20.

The invention has been described in detail with particular reference to certain preferred embodiments thereof, but it will be understood that variations and modifications can be effected within the spirit and scope of the invention.

PARTS LIST 10, 10a, 10b switchable imaging apparatus
11 switchable imaging apparatus
12 photographer
13a, 13b person
14, 14a, 14b image
15 communications network
16 subject
17 photographer's view
18 field of view
19 subject's view
20, 20a, 20b display screen
26k group of display pixels
30 switchable imaging apparatus
32 imaging optics
33 imaging sensor
34, 34a, 34b camera
36 light blocking layer
40, 40a, 40b controller
44 control wires
50, 50a, 50b switchable beam deflector
52 substrate
54 liquid crystal layer
56 air gap
58 protective layer
60 first material
62 second material
64 interface
70 switchable imaging apparatus
74, 74k switchable beam deflector
80 switchable image capture apparatus
82 image
84 frame
88 user control
110 transparent plate
111a, 111b, 111c transparent plate sections
113a, 113b transparent electrodes
120 switchable imaging apparatus
O, Oa, Ob optical axis
O', Oa', Ob' redirected optical axis
R1, R2 ray

What is claimed is:

1. A switchable imaging apparatus having an image display mode and an image capture mode, comprising:

a display screen having a first display state and a second transparent state wherein the display screen is at least partially transparent, the display screen having a front side oriented toward a scene and an opposing back side and including an array of display pixels energizable to provide a displayed image when the display screen is in the first display state;

an array of optical beam deflectors, wherein each optical beam deflector is configured to switch between a first non-deflecting state and a second deflecting state, such that when a particular optical beam deflector is in the first non-deflecting state light from the scene is able to pass through the particular optical beam deflector in an undeflected direction, and when the particular optical beam deflector is in the second deflecting state light from a corresponding section of the scene is able to be deflected from a first optical axis perpendicular to the display screen onto a second optical axis parallel to the display screen;

a camera positioned along the second optical axis in a location peripheral to the display screen; and a controller configured to switch the display screen between the first display state and the second transparent state, and the individual optical beam deflectors between their first non-deflecting state and their second deflecting state, and to initiate capture of images by the camera thereby providing the image display mode and the image capture mode.

2. The switchable imaging apparatus of claim 1, wherein the optical beam deflectors are configured to individually switch to their second deflecting state according to a sequential activation pattern to direct light from the corresponding section of the scene onto the camera, thereby providing a set of images of the sections of the scene.

3. The switchable imaging apparatus of claim 1, wherein a complete image of the scene is constructed by combining the images of the sections of the scene.

4. The switchable imaging apparatus of claim 3, wherein the process of combining the images of the sections of the scene includes an alignment step.

5. The switchable imaging apparatus of claim 3, wherein the images of the sections of the scene overlap, and wherein corresponding pixels in the overlapping images of the sections of the scene are combined to determine a corresponding pixel in the complete image.

6. The switchable imaging apparatus of claim 1, wherein each optical beam deflector in the array of optical beam deflectors is configured to extend in a direction parallel to one edge of the display screen, and is configured to deflect light from a corresponding section of the scene into the camera.

7. The switchable imaging apparatus of claim 6, wherein the camera includes an imaging sensor having linear array of sensor pixels configured to capture the images of the sections of the scene.

8. The switchable imaging apparatus of claim 1, wherein the controller is configured to switch the display screen to the first display state and all of the optical beam deflectors to their first non-deflecting state to provide the image display mode.

9. The switchable imaging apparatus of claim 1 wherein the controller is configured to switch the display screen to the second transparent state and all of the optical beam deflectors to their first non-deflecting state to provide a transparent mode.

10. The switchable imaging apparatus of claim 1, wherein each optical beam deflector includes at least one liquid crystal plane positioned at an oblique angle relative to the first optical axis, wherein the liquid crystal plane is configured to switch between a first refractive index and a second refractive index, wherein when the liquid crystal plane has the first refractive index light from the scene is transmitted undeflected, and when the liquid crystal plane has the second refractive index light from the scene is deflected by total internal reflection.

11. The switchable imaging apparatus of claim 1, wherein the controller is configured to alternate between the image display mode and the image capture mode according to a switching frequency, and wherein the switching frequency is selected to substantially avoid perceptible flicker in an image displayed in the image display mode.

12. The switchable imaging apparatus of claim 1, wherein the imaging apparatus is configured to be at least partially transparent when operating in the image display mode.

13. The switchable imaging apparatus of claim 1, further including a light blocking layer positioned behind the optical beam deflector.

14. The switchable imaging apparatus of claim 13, wherein the light blocking layer is an opaque light blocking layer or is a light scattering layer.

15. The switchable imaging apparatus of claim 13, wherein the light blocking layer is configured to be switchable between a transparent state and an opaque state or a light scattering state.

16. The switchable imaging apparatus of claim 1, wherein the camera includes an imaging lens positioned along the second optical axis and configured to focus the imaging light onto an imaging sensor.

17. The switchable imaging apparatus of claim 16, wherein the imaging sensor includes a one-dimensional array of sensor pixels.

18. The switchable imaging apparatus of claim 16, wherein the imaging sensor includes a two-dimensional array of sensor pixels.

19. The switchable imaging apparatus of claim 1, wherein the display screen is positioned between the scene and the set of optical beam deflectors such that the light from the scene passes through the display screen before being deflected by the optical beam deflectors.

20. The switchable imaging apparatus of claim 1, wherein the set of optical beam deflectors is positioned between the scene and the display screen such that the light from the scene is not able to pass through the display screen before being deflected by the optical beam deflectors.

21. The switchable imaging apparatus of claim 1, wherein an image of the scene captured using the camera while the imaging apparatus is in the image capture mode is displayed on the display screen while the imaging apparatus is in the image display mode.

22. The switchable imaging apparatus of claim 1, wherein an image received from a second imaging apparatus over a communications network is displayed on the display screen while the imaging apparatus is in the image display mode.

23. The switchable imaging apparatus of claim 22, wherein an image of the scene captured while the imaging apparatus is in the image capture mode is transmitted to the second imaging apparatus over the communications network to provide a teleconferencing function.

24. The switchable imaging apparatus of claim 1, wherein text is displayed on the display screen to provide a teleprompter or karaoke function.

25. The switchable imaging apparatus of claim 1, wherein an evaluation image is displayed on the display screen and the camera is used to capture an image of a viewer observing the evaluation image on the display screen.

* * * * *